(12) United States Patent
Kim et al.

(10) Patent No.: US 9,646,105 B2
(45) Date of Patent: May 9, 2017

(54) REDUCED COMPLEXITY HASHING

(71) Applicant: Texas Instruments Incorporated, Dallas, TX (US)

(72) Inventors: Hun-Seok Kim, Dallas, TX (US); Patrick Bosshart, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 258 days.

(21) Appl. No.: 13/922,327

(22) Filed: Jun. 20, 2013

(65) Prior Publication Data

US 2014/0129568 A1 May 8, 2014

Related U.S. Application Data

(60) Provisional application No. 61/724,115, filed on Nov. 8, 2012.

(51) Int. Cl.
   *G06F 17/30* (2006.01)
   *G06F 12/1018* (2016.01)
   *G06F 12/0864* (2016.01)

(52) U.S. Cl.
   CPC .... *G06F 17/30949* (2013.01); *G06F 12/1018* (2013.01); *G06F 12/0864* (2013.01)

(58) Field of Classification Search
   CPC .......... G06F 17/30949; G06F 12/1018; G06F 12/0864; H03M 13/166
   USPC ........ 707/698, 673, 696, 715, 741; 711/216; 714/758, 784–785; 708/492
   See application file for complete search history.

(56) References Cited

U.S. PATENT DOCUMENTS

| | | | | |
|---|---|---|---|---|
| 3,825,894 A * | 7/1974 | Johnson, Jr. | ............ | G06F 11/10 714/703 |
| 4,162,480 A * | 7/1979 | Berlekamp | ................... | 714/784 |
| 4,215,402 A * | 7/1980 | Mitchell et al. | .............. | 711/216 |
| 4,538,240 A * | 8/1985 | Carter et al. | ................... | 708/492 |
| 5,559,453 A * | 9/1996 | Covino | ............ | H03K 19/00323 326/121 |
| 6,097,725 A * | 8/2000 | Glaise | ................. | H04L 12/5601 370/392 |
| 6,877,119 B2 * | 4/2005 | Lauga | ............. | G01R 31/31853 714/726 |
| 7,039,854 B1 * | 5/2006 | Ireland | ................ | H03M 13/159 708/492 |
| 7,085,988 B1 * | 8/2006 | Weng | ........................... | 714/758 |
| 7,103,832 B2 * | 9/2006 | Leonard | ............. | H03M 13/091 714/807 |
| 7,177,891 B2 * | 2/2007 | Stein et al. | ................... | 708/492 |
| 7,231,572 B2 * | 6/2007 | Clark | ............... | G01R 31/31715 326/52 |
| 7,242,219 B1 * | 7/2007 | Mahurin | ............. | H03K 19/215 326/52 |
| 7,472,334 B1 * | 12/2008 | Scott | ................... | H03M 13/151 714/785 |
| 7,557,614 B1 * | 7/2009 | Bonsels | ............... | H03K 19/215 326/54 |

(Continued)

*Primary Examiner* — Frantz Coby
(74) *Attorney, Agent, or Firm* — John R. Pessetto; Charles A. Brill; Frank D. Cimino

(57) ABSTRACT

Hashing complexity is reduced by exploiting a hashing matrix structure that permits a corresponding hashing function to be implemented such that an output vector of bits is produced in response to an input vector of bits without combining every bit in the input vector with every bit in any row of the hashing matrix.

20 Claims, 3 Drawing Sheets

(56) References Cited

U.S. PATENT DOCUMENTS

| | | | | |
|---|---|---|---|---|
| 7,805,595 B2* | 9/2010 | Ozer | | G06F 9/383 |
| | | | | 712/239 |
| 7,827,384 B2* | 11/2010 | Zhang | | G06F 7/724 |
| | | | | 711/216 |
| 7,952,587 B2* | 5/2011 | Hansen et al. | | 345/522 |
| 7,963,306 B2* | 6/2011 | McCauley et al. | | 152/219 |
| 8,006,150 B2* | 8/2011 | Sinanoglu | | G01R 31/31854 |
| | | | | 714/726 |
| 8,082,359 B2 | 12/2011 | Chauhan | | |
| 8,452,006 B2* | 5/2013 | Alekseev | | G06F 7/00 |
| | | | | 380/28 |
| 8,804,950 B1* | 8/2014 | Panwar | | H04L 9/06 |
| | | | | 380/28 |
| 2004/0078409 A1* | 4/2004 | Stein et al. | | 708/492 |
| 2005/0268209 A1* | 12/2005 | Mann | | H03M 13/6572 |
| | | | | 714/776 |
| 2006/0235895 A1* | 10/2006 | Rodriguez | | H04N 21/631 |
| 2008/0154998 A1* | 6/2008 | Ikeda | | H03M 13/00 |
| | | | | 708/210 |
| 2008/0189381 A1 | 8/2008 | Poirier | | |
| 2008/0279368 A1* | 11/2008 | Yen | | H04L 9/0637 |
| | | | | 380/28 |
| 2009/0080646 A1* | 3/2009 | Yen | | 380/28 |
| 2009/0240913 A1* | 9/2009 | Obana | | H04L 9/0662 |
| | | | | 711/216 |
| 2010/0115017 A1* | 5/2010 | Yen | | G06F 7/724 |
| | | | | 708/492 |
| 2010/0125728 A1* | 5/2010 | Gueron | | H04L 9/0631 |
| | | | | 713/150 |
| 2010/0303229 A1* | 12/2010 | Unruh | | H04L 9/0637 |
| | | | | 380/28 |
| 2011/0246548 A1* | 10/2011 | Yen | | G06F 7/724 |
| | | | | 708/492 |
| 2012/0226731 A1* | 9/2012 | Gashkov | | G06F 17/505 |
| | | | | 708/620 |
| 2014/0006753 A1* | 1/2014 | Gopal et al. | | 712/221 |
| 2014/0016774 A1* | 1/2014 | Wolrich et al. | | 380/28 |

* cited by examiner

REDUCED COMPLEXITY HASHING

This application claims the priority under 35 USC §119 (e)(1) of provisional application Ser. No. 61/724,115, filed on Nov. 8, 2012 and incorporated herein by reference.

FIELD

The present work relates generally to hashing functions and, more particularly, to reduced complexity implementations of hashing functions.

BACKGROUND

Hashing functions are widely used to accelerate finding items in a large database. Typically, the hashing function output is an index for a location in memory where the entry matched with the hashing input may be stored. The size of memory space indexed by the hashing output is much smaller than the cardinality of input space. Hashing is used to assign pseudo-randomly generated input entries to particular locations in a finite memory space. The memory utilization is maximized when the rate of hashing collisions is minimized. A hashing collision occurs when multiple different hashing inputs result in the same hashing output value. Assuming the input distribution is uniform, it is desired to have uniform hashing output distribution to minimize the probability of a hashing collision.

One example use for a hashing function is routing table lookup in a network switch. Network switches use hashing functions to store and find routing information. Consider an IPv6 network switch which can store 64 k entries in a routing table. Each routing table entry consists of an IPv6 destination address paired with a forwarding port. The location of an entry in the routing table is identified by the hashing function output produced when an IPv6 destination address is input to the hashing function. When a packet arrives at the network switch, the hashing function output is computed based on the IPv6 destination address input extracted from the packet. The hashing function output provides the index for a routing table entry which may contain the matching IPv6 address. In this particular example, the hashing input is the 128-bit wide IPv6 destination address and the hashing output is 16-bit wide index that points to a location in the 64 k-entry routing table. In other words, the hashing function is a mapping from a 128-bit input to a 16-bit output.

In network switch applications, the bit width of the input to the hashing function can be very large when routing rules consist of many tuples such as MAC addresses, IPv6 addresses, TCP port numbers, etc. In the OpenFlow standard, for example, the network switch flow rule requires a hashing input of more than 600 bits. Meanwhile, the hashing function throughput requirement for network switch applications is very stringent in order to search flow routing rules fast enough to keep pace with the incoming packet traffic rate. For example, a network switch with 64 instances of 10 Gbps ports requires nearly 1 billion table look-ups per second. It is highly desirable to have a uniform hashing output distribution in order to maximize memory space utilization with minimum hashing collisions.

One popular conventional hashing technique is based on XOR (exclusive-OR) operations. As previously indicated, a hashing function is a mapping between an n-bit input and an m-bit output. Typically, the input bit width n is much larger than the output bit width m ($n \gg m$). Let x be the 1×n vector of hashing input bits, and let y be the 1×m vector of hashing output bits. The XOR hashing output y is obtained by GF(2) (Galois field 2) multiplication of the input vector x and an n×m binary matrix H, as shown below $$y = x \cdot H \qquad (1)$$

where "·" indicates vector-matrix GF(2) multiplication. The binary matrix H is called the hashing matrix.

The XOR-based hashing represented by (1) above can be implemented in hardware using XOR logic. Let $x(a)$ be the a-th bit of the vector x, $H(a, b)$ the (a, b) component of the hashing matrix H, $H(:, b)$ the b-th column of H, and $H(a, :)$ the a-th row of H. Each bit of the output vector y is obtained by XORing selected bits in the input vector x. The XOR input selection for the i-th bit of y, $y(i)$, is dictated by non-zero bit positions of the i-th column of H, $H(:, i)$. For example, if $H(1,i)=H(4, i)=H(7,i)=1$, while all other components of $H(:, i)$ are zero, then $y(i)$ is obtained by XORing $x(1)$, $x(4)$ and $x(7)$.

In many practical systems, it is important for the hashing matrix H to be programmable, so the hashing function can be updated according to input statistics. In some applications, H can be randomly chosen for security purposes. Typically, H is programmed during system initialization. In order to program the n×m binary matrix H, n×m bits are required in programming memory space.

If H is permitted to be an arbitrary n×m binary matrix, then the XOR-based hashing function can be implemented as shown in FIG. 1. In this conventional architecture, the hashing matrix H is an arbitrary n×m binary matrix, and the hashing output is obtained according to (1) above. When the 1×n input vector x is very large, however, the FIG. 1 architecture disadvantageously requires a correspondingly large programming memory space (n×m bits to program H). Also, the architecture has considerable complexity, because each bit of the 1×m output vector y requires an XOR tree with n input bits. Note that the select logic of FIG. 1 combines every bit in input vector x with every bit in a corresponding row of hashing matrix H.

The desirability of hashing large bit-width inputs to produce a uniform output distribution, and with low complexity, low programming memory space, low latency and high throughput, is evident in view of the foregoing.

DETAILED DESCRIPTION

Figure 1:
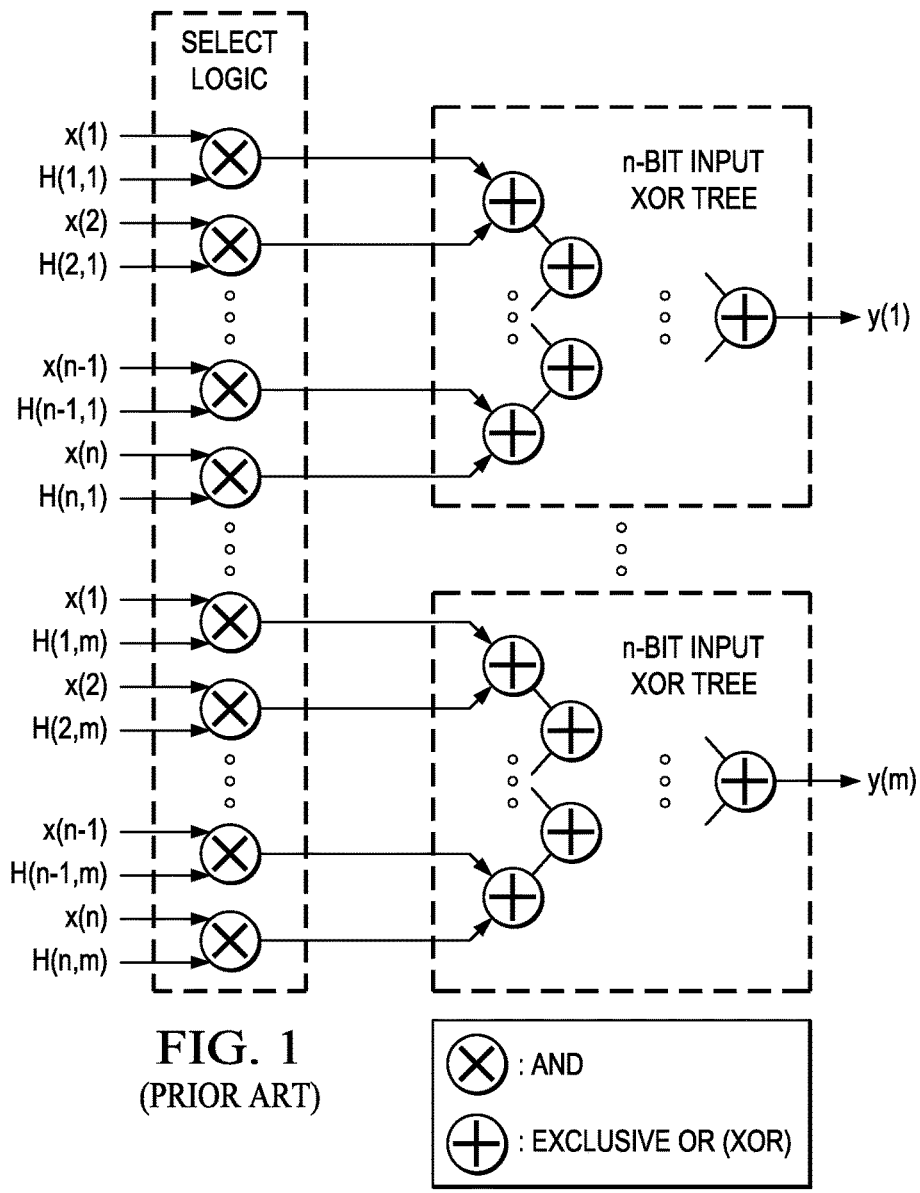
FIG. 1 diagrammatically illustrates a conventional hashing architecture.

The present work provides minimum Hamming weight XOR-based hashing that has a uniform output distribution property, with significantly lower complexity, as well as potentially better throughput and latency, than conventional XOR-based hashing of the type shown in FIG. 1.

In minimum Hamming weight XOR hashing, the hashing matrix H has the structure given by (2) below, where each constituent matrix $C_j$ (j=1, 2, . . . , n/m) is an m×m binary matrix having the property that the Hamming weight of every row and every column is 1.

$$H = \begin{bmatrix} C_1 \\ \vdots \\ C_{n/m} \end{bmatrix} \quad (2)$$

A hashing matrix with this structure and property guarantees that each input bit is used only once for hashing output computation, and that each input bit contributes to only one output bit. This is so because the Hamming weight for any row of H is 1. If any row had Hamming weight=0, this indicates that the corresponding input bit would not be used for the hashing output computation. Requiring each row to have Hamming weight=1 is the minimum requirement to fully utilize the input bits.

The column Hamming weight constraint (Hamming weight of every column of $C_j$ is 1) minimizes Hamming weight variation among the $C_j$ columns. It implies that all hashing output bits are computed by XORing the same number of input bits when n is a multiple of m. The structure given by (2) above assumes that n is a multiple of m. If not, in order to construct a minimum Hamming weight matrix H, some embodiments employ floor(n/m) instances of m×m matrices $C_1, \ldots C_{floor(n/m)}$, and additional (n−m*floor(n/m)) rows $c_1, \ldots c_{n-m*floor(n/m)}$, each of whose Hamming weights is 1. No two of these additional rows should be identical, and each additional row can be located at any row position of H. Two examples of minimum Hamming weight hashing matrices follow, the first with n=16 and m=4, and the second with n=10 and m=4, and where $I_{4 \times 4}^{perm}$ is a randomly permuted A×A identity matrix.

$$H = \begin{bmatrix} C_1 \\ C_2 \\ C_3 \\ C_4 \end{bmatrix} = \begin{bmatrix} I_{4 \times 4}^{perm} \\ I_{4 \times 4}^{perm} \\ I_{4 \times 4}^{perm} \\ I_{4 \times 4}^{perm} \end{bmatrix}$$

$$H = \begin{bmatrix} C_1 \\ c_1 \\ c_2 \\ C_2 \end{bmatrix} = \begin{bmatrix} \begin{bmatrix} 0 & 1 & 0 & 0 \\ 0 & 0 & 1 & 0 \\ 1 & 0 & 0 & 0 \\ 0 & 0 & 0 & 1 \end{bmatrix} \\ [0 \; 1 \; 0 \; 0] \\ [0 \; 0 \; 0 \; 1] \\ \begin{bmatrix} 0 & 0 & 0 & 1 \\ 0 & 1 & 0 & 0 \\ 1 & 0 & 0 & 0 \\ 0 & 0 & 1 & 0 \end{bmatrix} \end{bmatrix}$$

As noted above, it is often desired to provide a hashing output with uniform distribution. Minimum Hamming weight XOR hashing guarantees uniform output distribution as long as the input distribution is uniform. Its complexity, meanwhile, is significantly lower than that of fully arbitrary matrix based XOR hashing (such as shown in FIG. 1).

A minimum Hamming weight hashing matrix H as shown in (2) above may be represented with less than n×m bits. Using the fact that the Hamming weight of each row is 1, it is possible to describe each row of the H matrix with a permute value, 'perm', having ceil($\log_2(m)$) bits. The 'perm' value for a given row basically indicates the position of the non-zero bit in that row. To fully describe the H matrix, n 'perm' values, perm(1), ... perm(n), are needed, one 'perm' value for each row of H or, equivalently, one for each input bit.

Figure 2:
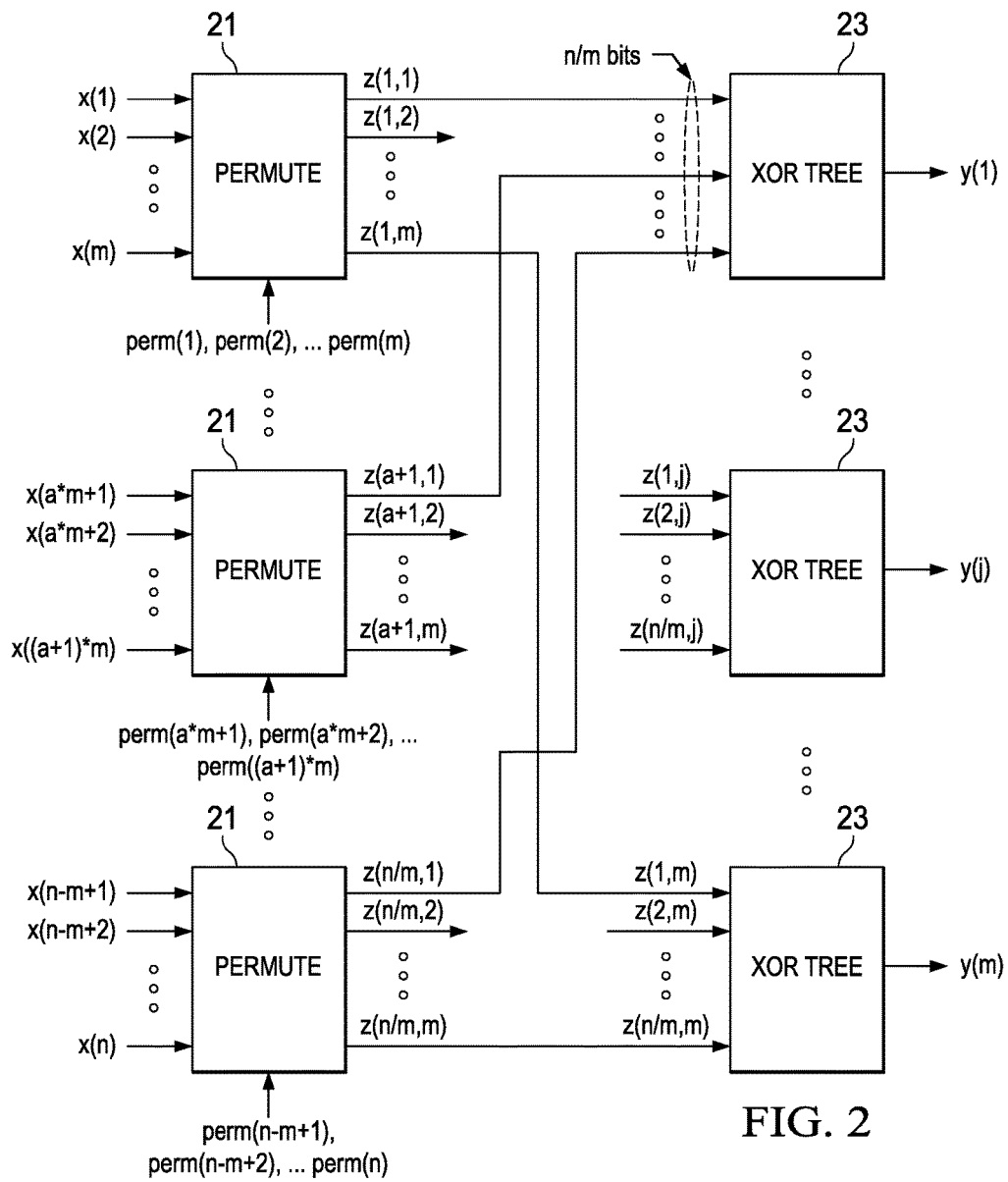
FIG. 2 diagrammatically illustrates a hashing architecture according to example embodiments of the present work.

FIG. 2 diagrammatically illustrates an architecture according to example embodiments of the present work that realizes minimum Hamming weight XOR hashing when n is a multiple of m. It will be evident to workers in the art that extension to the more generic case (i.e., where n is not a multiple of m) is straightforward. In FIG. 2, each of n/m instances of permute logic 21 produces a 1×m vector z(a+1, :) by computing GF(2) vector-matrix multiplication x(a*m+1, ..., (a+1)*m)·$C_a$, where a=0, 1, ..., n/m−1 for the respective instances of permute logic 21. An output bit z(a+1, b), for b=1, 2, ..., m, of a given instance of permute logic 21 is obtained by selecting one bit among m input bits x(a*m+1), ..., x((a+1)*m) indexed by a perm(a*m+b) signal. In other words, each output bit of each instance of permute logic 21 can be implemented by a corresponding m-bit (i.e., m-to-1) multiplexer. The m bits output from each permute logic 21 are respectively fed to m XOR trees 23. Each of the m XOR trees 23 receives n/m input bits (one from each permute logic 21), and produces a corresponding bit (y(1), y(2), ... y(m)) of the hashing output vector y by obtaining the XOR result for the n/m input bits.

Table 1 below summarizes the complexity of the fully generic XOR hashing (see e.g., FIG. 1) and the minimum Hamming weight XOR hashing (see e.g., FIG. 2). The memory requirement for programming the hashing matrix H is significantly lower for the minimum Hamming weight XOR hashing since one 'perm' value having ceil($\log_2(m)$) bits is sufficient to represent each row of H, while a generic matrix requires m bits per row. For an n=640, m=16 example, the complexity of the permute logic 21 of FIG. 2 is similar to that of the select logic of FIG. 1. However, minimum Hamming weight XOR hashing exploits the sparse H matrix structure and provides 16× lower complexity in implementing the XOR trees.

TABLE 1

|  | Minimum Hamming weight XOR hashing | Fully generic XOR hashing | Complexity ratio: n = 640, m = 16 case (Fully generic/Minimum Hamming weight) |
| --- | --- | --- | --- |
| H matrix programming | perm(1), ..., perm(n) while each 'perm' signal is ceil(log2(m)) bits wide Total: n * ceil($\log_2(m)$) bits | n * m bits to represent an n × m binary matrix n = 640, m = 16 case: 10240 bits | 4 |

TABLE 1-continued

|  | Minimum Hamming weight XOR hashing | Fully generic XOR hashing | Complexity ratio: n = 640, m = 16 case (Fully generic/Minimum Hamming weight) |
|---|---|---|---|
| Permutation or Select logic | n = 640, m = 16 case: 2560 bits n/m instances of permute logic Each permute logic consists of m instances of m-bit input mux. Total: n instances of m-input mux n = 640, m = 16 case: 9600 instances of 2-input AND gate | n * m instances of 2-bit input AND gate n = 640, m = 16 case: 10240 instances of 2-input AND gate | 1.07 |
| XOR tree | m instances of n/m bit input XOR tree n = 640, m = 16 case: 624 instances of 2-input XOR gate | m instances of n bit input XOR tree n = 640, m = 16 case: 10224 instances of 2-input XOR gate | 16.38 |

In order to further decrease complexity of the minimum Hamming weight hashing, some embodiments impose additional constraints on the matrices $C_j$ in (2) above. One example is the sub-matrix structure given in (3):

$$C_j = \begin{bmatrix} A_{1,1} & A_{1,2} & \cdots & A_{1,m/k} \\ A_{2,1} & \ddots & & \\ \vdots & & & \\ A_{m/k,1} & & & \end{bmatrix} \qquad (3)$$

where $A_{a,b}$ is a k×k matrix (k<m, m is a multiple of k), and a and b are the respective row and column indices of the constituent k×k matrices A in $C_j$. There is only one non-zero matrix among matrices $A_{a,1}, \ldots A_{a,m/k}$ for a given row index a. The number of non-zero matrices among $A_{1,b}, \ldots A_{m/k,b}$ for a given column index b is also 1. Each non-zero matrix $A_{a,b}$ in (3) above is a permuted k×k identity matrix. An example of H for n=16, m=4, k=m/2 is given below.

$$H = \begin{bmatrix} C_1 \\ C_2 \\ C_3 \\ C_4 \end{bmatrix} = \begin{bmatrix} \begin{bmatrix} I_{2\times 2}^{perm} & 0 \\ 0 & I_{2\times 2}^{perm} \end{bmatrix} \\ \begin{bmatrix} 0 & I_{2\times 2}^{perm} \\ I_{2\times 2}^{perm} & 0 \end{bmatrix} \\ \begin{bmatrix} 0 & I_{2\times 2}^{perm} \\ I_{2\times 2}^{perm} & 0 \end{bmatrix} \\ \begin{bmatrix} I_{2\times 2}^{perm} & 0 \\ 0 & I_{2\times 2}^{perm} \end{bmatrix} \end{bmatrix}$$

Figure 3:
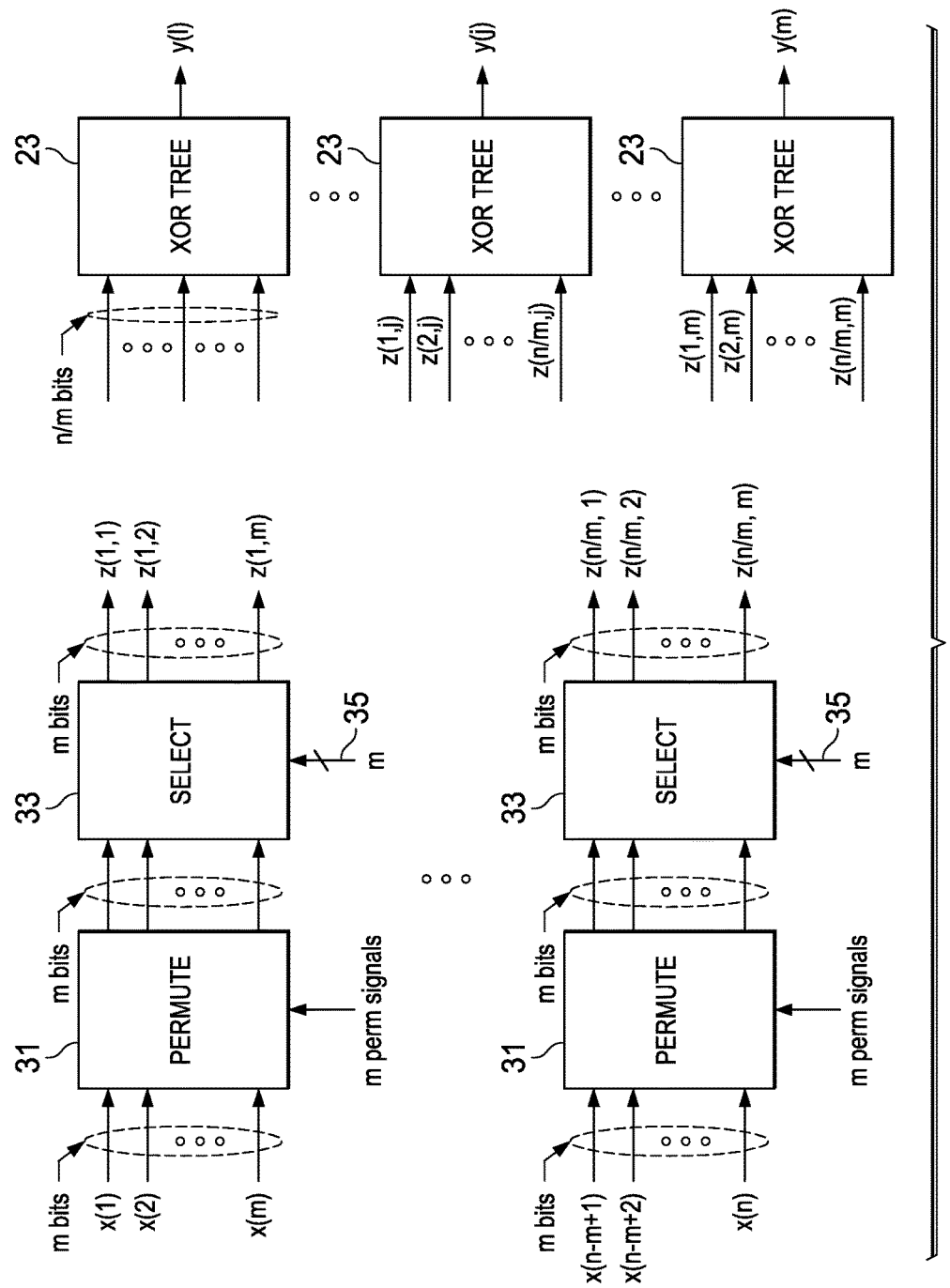
FIG. 3 diagrammatically illustrates a hashing architecture according to further example embodiments of the present work.

FIG. 3 diagrammatically illustrates a hashing architecture according to example embodiments of the present work when the hashing matrix structure of (3) is applied. Each of n/m sets of m input bits is applied to a corresponding two-stage cascaded arrangement of permute logic 31 and select logic 33. Permutation is performed separately for each k-bit segment of input bits. The permute logic 31 operates analogously to permute logic 21 of FIG. 2, but permutes each k input bit segment using the only non-zero matrix among $A_{a,1}, \ldots A_{a,m/k}$ for a given row index a. Because the non-zero matrix dimension is k×k, each of the m 'perm' signals for a given permute logic 31 can be represented by ceil($\log_2(k)$) bits. The select logic 33 maps a k-bit segment of m permuted bits to m bit positions based on the non-zero matrix location among $A_{1,b}, \ldots A_{m/k,b}$ for a given column index b. Therefore, each select logic 33 uses m select signals 35 having ceil($\log_2(m/k)$) bits each. Each select logic 33 produces m output bits equivalent to those produced by permute logic 21 of FIG. 2. The m XOR trees 23 of FIG. 3 operate in the same manner as in FIG. 2, receiving and processing the bits output by the select logic stages 33 in the same manner that the m XOR trees 23 in FIG. 2 receive and process the bits output from the permute logic stages 21.

By using the sub-matrix structure of (3), the permute and select logics 31 and 33 can be implemented with, respectively, n instances of a k-input multiplexer (m multiplexers per logic 31) and n instances of an m/k input multiplexer (m multiplexers per logic 33). In the example case of n=640, m=16, k=4, the total complexity of the permute and select logics 31 and 33 is equivalent to 3840 instances of a 2-input AND gate, for a 2.67× complexity reduction compared to the total complexity required by the permute logics 21 of FIG. 2, which is equivalent to 9600 instances of a 2-input AND gate.

Figure 4:
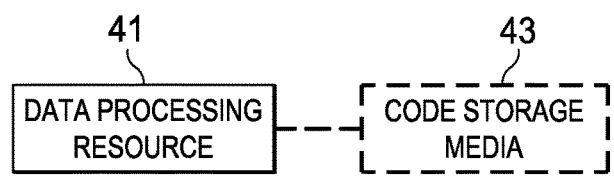
FIG. 4 diagrammatically illustrates a data processing arrangement capable of implementing some or all of the hashing functionalities of FIGS. 2 and 3.

Various embodiments implement the architectures of FIGS. 2 and 3 in various manners, for example, hardware, software, and combinations of hardware and software. FIG. 4 illustrates that, in some embodiments, the functionalities (or some portion thereof) described above relative to FIG. 2 (or FIG. 3) are implemented by a suitable data processing resource 41 executing code stored on suitable machine-readable code storage media 43. The code storage media 43 is shown in broken line to indicate that the storage media may be physically distinct from the data processing resource 41, or may be partially or fully integrated with the data processing resource 41.

As noted above, the conventional arrangement of FIG. 1 combines every bit in input vector x with every bit in a corresponding row of hashing matrix H. In contrast, as is evident from the foregoing descriptions of FIGS. 2 and 3, the present work does not combine every bit in x with every bit in any row of H. As a result, and as noted above in Table 1, the XOR trees 23 of FIGS. 2 and 3 require a significantly lower gate count than those of FIG. 1.

Figure 5:
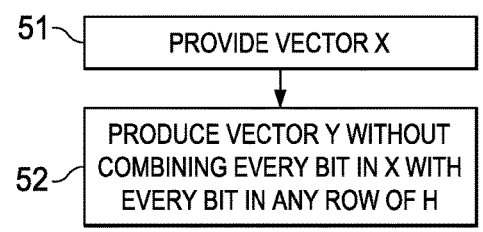
FIG. 5 illustrates operations that may be performed according to example embodiments of the present work.

FIG. 5 illustrates operations that may be performed according to example embodiments of the present work. The embodiments described above relative to FIGS. 2 and 3 are capable of performing the illustrated operations. At 51, the hashing input vector x is provided. At 52, the hashing output vector y is produced without combining every bit in x with every bit in any row of the hashing matrix H.

Although example embodiments of the present work have been described above in detail, this does not limit the scope of the work, which can be practiced in a variety of embodiments.

What is claimed is:

1. A hashing circuit, comprising:
a plurality of N/M permutation circuits, where N and M are positive integers, wherein each permutation circuit is coupled to receive M respective input bits and M respective permutation signals, and wherein each of the M respective permutation signals selects one of the M respective input bits as an output bit of the respective permutation circuit; and
a plurality of M exclusive OR (XOR) tree circuits, wherein each XOR tree circuit is coupled to receive one output bit from each of the N/M permutation circuits, and wherein the plurality of M XOR tree circuits produces M output bits of a hashing vector comprising a single output bit from each XOR tree circuit.

2. The hashing circuit of claim 1, wherein each permutation circuit comprises M M-to-1 multiplex circuits, wherein each multiplex circuit is coupled to receive the M respective input bits, and wherein a respective permutation signal selects one of the M respective input bits.

3. The hashing circuit of claim 1, wherein each permutation circuit comprises a plurality of AND gates, and wherein each AND gate is coupled to receive a respective input bit and a respective permutation signal.

4. The hashing circuit of claim 1, wherein N is an integer multiple of M.

5. The hashing circuit of claim 1, wherein each permutation signal comprises $\text{ceil}(\log_2(M))$ bits, which is the smallest positive integer that is greater than or equal to $\log_2(M)$.

6. The hashing circuit of claim 1, wherein each permutation signal of a respective permutation circuit selects one of the M respective input bits of the respective permutation circuit.

7. The hashing circuit of claim 1, wherein each of the N/M permutation circuits is implemented in software.

8. A hashing circuit, comprising:
a plurality of N/M permutation circuits, where N and M are positive integers, wherein each permutation circuit is coupled to receive M respective input bits and M respective permutation signals, and wherein each of the M respective permutation signals selects a plurality of K bits of the M respective input bits as permutation output bits of the respective permutation circuit, where M is an integer multiple of K;
a plurality of N/M select circuits, wherein each select circuit is coupled to receive a respective plurality of permutation output bits and M respective select signals, and wherein each select circuit produces M respective selected bits in response to the M select signals; and
a plurality of M exclusive OR (XOR) tree circuits, wherein each XOR tree circuit is coupled to receive one of the selected bits bit from each of the N/M select circuits, and wherein the plurality of M XOR tree circuits produces M output bits of a hashing vector comprising a single output bit from each XOR tree circuit.

9. The hashing circuit of claim 8, wherein each permutation circuit comprises M K-input multiplex circuits, wherein each multiplex circuit is coupled to receive the K respective input bits, and wherein a respective permutation signal selects one of the respective input bits.

10. The hashing circuit of claim 8, wherein each permutation circuit comprises a respective plurality of AND gates, each AND gate coupled to receive a respective input bit and a respective permutation signal.

11. The hashing circuit of claim 8, wherein N is an integer multiple of M.

12. The hashing circuit of claim 8, wherein each permutation signal comprises $\text{ceil}(\log_2(K))$ bits, which is the smallest positive integer that is greater than or equal to $\log_2(K)$.

13. The hashing circuit of claim 8, wherein each permutation signal of a respective permutation circuit selects a plurality of K of the M respective input bits of the respective permutation circuit.

14. A method of producing a hashing vector, comprising:
receiving M respective input bits at each of a plurality of N/M permutation circuits, where N and M are positive integers and N is greater than M;
producing M respective output bits from each of the N/M permutation circuits in response to the respective input bits;
receiving one of the output bits from each of the N/M permutation circuits by each of a plurality of M exclusive OR (XOR) tree circuits; and
producing M output bits of a hashing vector comprising a single output bit from each XOR tree circuit in response to the output bits from the N/M permutation circuits.

15. The method of claim 14, comprising producing the M respective output bits from each of the N/M permutation circuits in response to a plurality of M respective permutation signals.

16. The method of claim 15, wherein each permutation signal of a respective permutation circuit selects a respective one of the M input bits of the respective permutation circuit.

17. The method of claim 14, wherein each permutation circuit comprises M M-to-1 multiplex circuits, wherein each multiplex circuit is coupled to receive the M respective input bits, and wherein a respective permutation signal selects one of the M respective input bits.

18. The method of claim 14, wherein each permutation circuit comprises a respective plurality of AND gates, and wherein each AND gate is coupled to receive a respective input bit and a respective permutation signal.

19. The method of claim 14, wherein N is an integer multiple of M.

20. The method of claim 14, wherein each permutation signal comprises $\text{ceil}(\log_2(M))$ bits, which is the smallest positive integer that is greater than or equal to $\log_2(M)$.

* * * * *